United States Patent [19]

Cameron

[11] 4,317,577
[45] Mar. 2, 1982

[54] ROTARY EXPANDABLE TOOL WITH HYDRAULIC INTERNAL INTENSIFIER

[76] Inventor: Gordon N. Cameron, 859 Whitcomb Blvd., Madison Heights, Mich. 48071

[21] Appl. No.: 131,624

[22] Filed: Mar. 19, 1980

[51] Int. Cl.³ .................................................. B23B 31/40
[52] U.S. Cl. .................................. 279/2 A; 242/72 R; 269/48.1
[58] Field of Search .................. 279/2 A, 4; 242/72 R, 242/72 B; 60/560, 593; 269/22, 48.1

[56] References Cited

U.S. PATENT DOCUMENTS

| | | | |
|---|---|---|---|
| 2,711,863 | 6/1955 | Grettve | 279/4 X |
| 3,922,952 | 12/1975 | Roddy et al. | 279/4 X |
| 4,040,338 | 8/1977 | Wilson et al. | 279/4 X |
| 4,147,312 | 4/1979 | Secor et al. | 242/72 R |

*Primary Examiner*—Robert D. Baldwin

[57] ABSTRACT

A relatively high fluid pressure actuated rotary arbor or chuck having internal pressure intensifying differential pistons for converting relatively low pressure from an outside supply through a relatively low pressure non-rotating coupling connection. A dual inlet in the non-rotating coupling and associated passages to the larger piston provide for air or hydraulic piston retraction as well as actuation of the intensifying piston.

8 Claims, 6 Drawing Figures

ROTARY EXPANDABLE TOOL WITH HYDRAULIC INTERNAL INTENSIFIER

BACKGROUND OF THE INVENTION

Applicant has previously developed hydraulically actuated arbor and chuck construction such as disclosed in U.S. Pat. No. 3,202,432 issued Aug. 24, 1965, which require manual or power actuation while the tool is stationary. It is known prior art to employ externally and intensified pressure to a stationary arbor or chuck such as disclosed in said patent; however, fluid pressure couplings for connecting an outside source with a rotary element have been limited to moderate maximum pressure in the order of 1000 psi compared to required actuating pressures which may be in the order of 4000 to 5000 psi.

Gas-liquid hydraulic expandable chucks and shafts having an internal closed liquid hydraulic intensifying system are disclosed in U.S. Pat. No. 4,147,312 which involve, however, the use of a removable air pressure hose to actuate the intensifying piston with the tool in a stationary condition. In any such high pressure chucks or arbors which require pressurizing with the tool stationary, the possibility of leakage resulting in a loss of holding pressure during operation with resulting slippage damaging workpiece and tool has created a long existing need for a solution which would assure maintenance of required high pressure throughout the operating cycle; also to facilitate rapid and automatic release and engagement of workpiece for production runs with positively controlled accuracy of pressure for actuation thereby facilitating automation.

SUMMARY OF THE INVENTION

The present invention solves the problem by combining a rotary relatively low pressure coupling, which may be supplied at a fixed connection with an accurately controllable hydraulic pressure from a stationary supply, applied to an internal intensifying pressure system housed and completely self contained within the rotary chuck or arbor. A dual passage air-hydraulic rotating union is adapted to provide intensified hydraulic actuation together with air or oil return overcoming any seal resistance to release. A continuous connection with the external supply of hydraulic fluid provides makeup for any leakage while standard moderate pressure commercially available rotary fittings are employed to sustain pressure throughout the operating cycles of a production run.

DETAILED DESCRIPTION OF PREFERRED EMBODIMENTS

Figure 1:
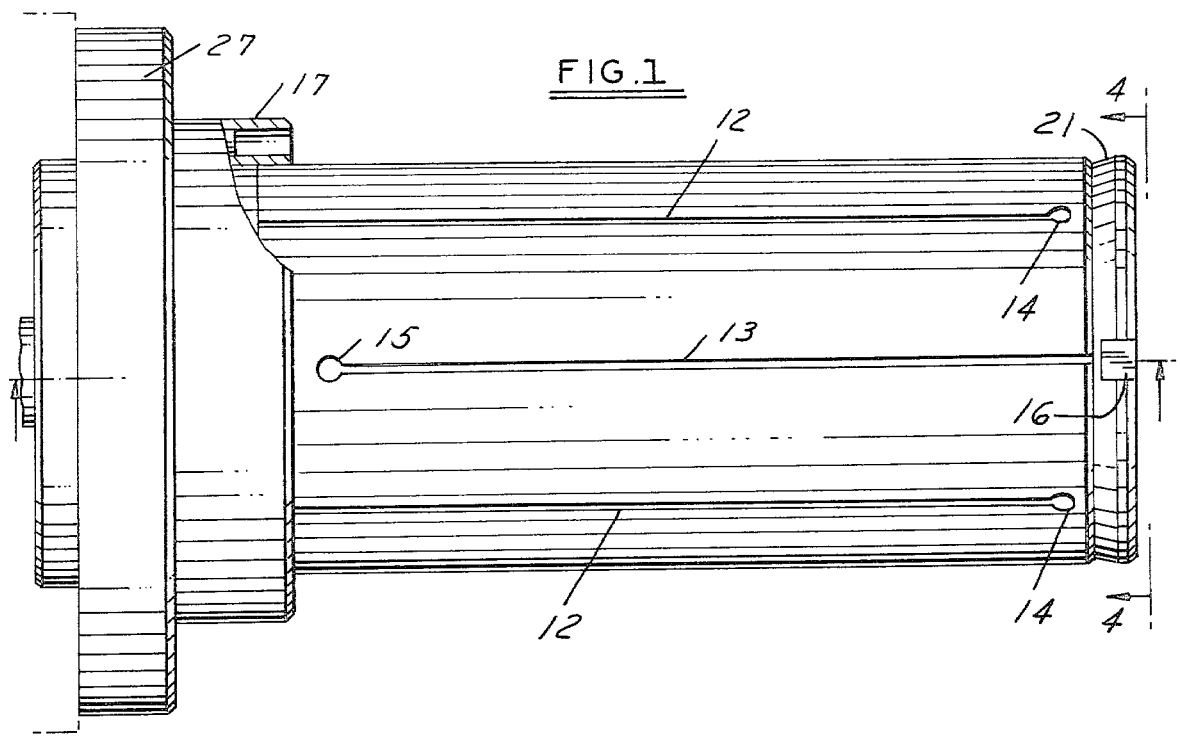
FIG. 1 is a side elevation for an expandable arbor constructed in accordance with the present invention.
Figure 2:
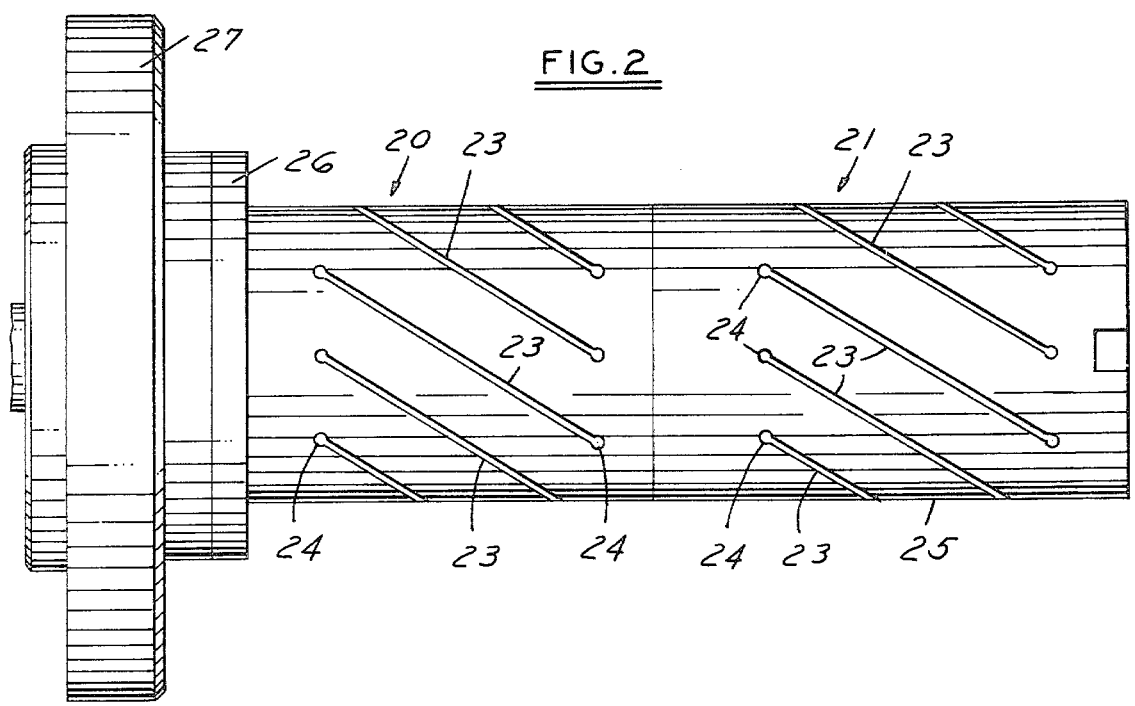
FIG. 2 is a side elevation of the arbor shown in FIG. 1 with the outer expandable sleeve and end stop removed.

Referring to FIG. 1 illustrating an expandable arbor constructed in accordance with the present invention, the workpiece engaging exterior surface 10 is provided with longitudinal slots 12 and 13 equally spaced around the cylindrical perimeter which extend respectively from starting holes 14 and 15 near opposite ends throughout the complete length of the sleeve running out alternately at the respective sleeve ends thereby providing a readily expandable outer adapter sleeve which, with different outer diameters, can be used on the same basic expandable arbor shown in FIG. 2 with the outer sleeve 11 and end retainers 16 removed. A removable collar 17 provides an end stop surface 18 for a workpiece such as shown at phantom at 19 in FIG. 3.

With reference to FIG. 2 each of a pair of inner sleeves 20 and 21 is provided with a plurality of relatively closed spaced diagonal slots 23 which provide longitudinally spaced expansion areas 24 and 25 for engaging the closely fitting innter surface of the outer sleeve 11. Since such slots terminate at both ends 24 short of the ends of the otherwise integral sleeves 20 and 21 the expansion force required to actuate such sleeves, even with relatively reduced wall thickness and more closely spaced slots, is considerably greater than the outer adapter sleeve 11 and in order to adequately hold the workpiece against torsional machining forces encountered with heavy cuts hydraulic pressures in the order of 4000 to 5000 psi may be required to be applied over the inner surface of the expansion areas.

Figure 3:
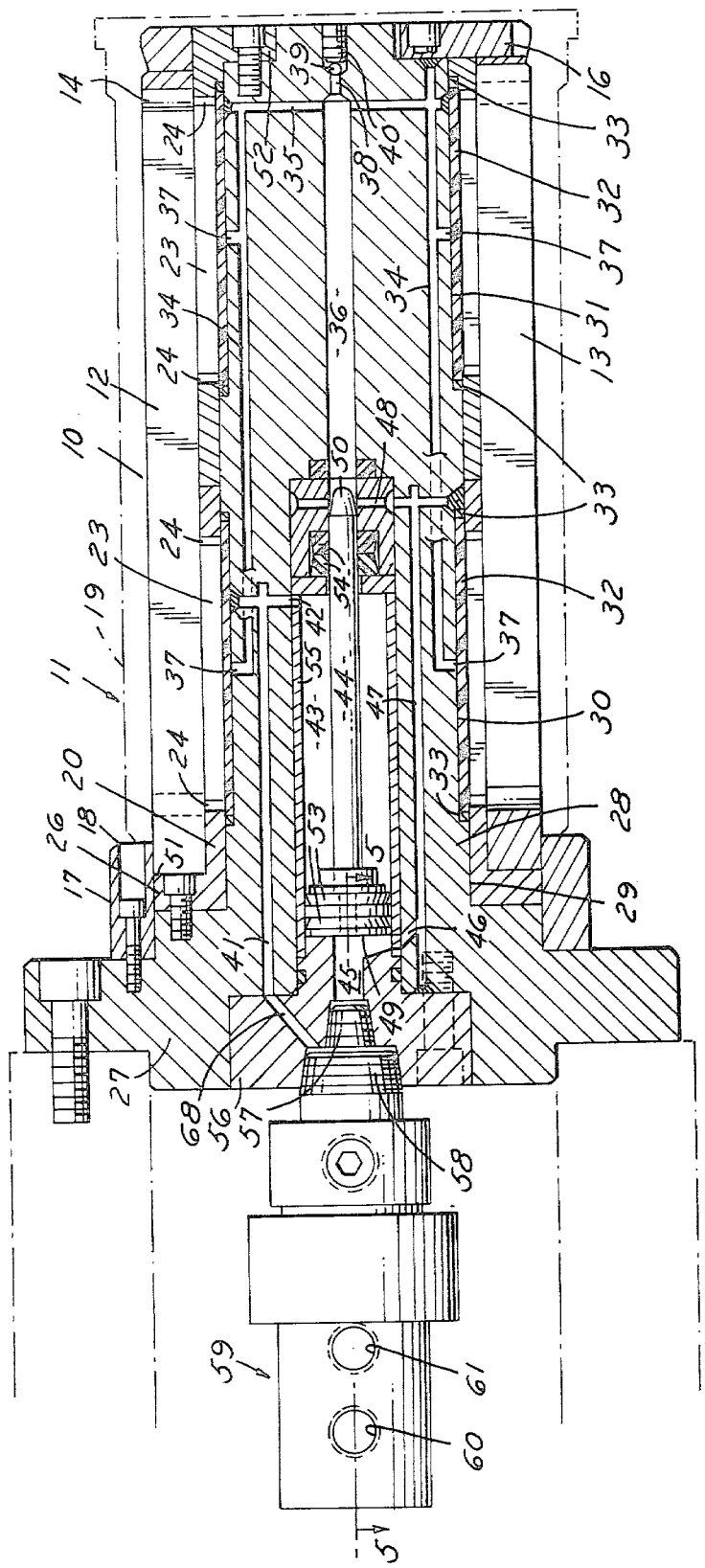
FIG. 3 is a sectional view taken along the line 3—3 of FIG. 1.

With reference to FIG. 3 alternate slot extremities 12 and 13 of the outer sleeve 11 at the top and bottom of the sectional view are shown in a manner out of the phase with the with the section line 3—3, and the slots 23 with terminal ends 24 are illustrated as if straight rather than diagonal for simplicity and clarity of illustration.

The inner sleeve 20 is provided with a shoulder 26 bolted to an annular flange 27 of the main structural arbor body 28 which has a cylindrical surface 29 closely fitting with the inner surface of the respective sleeves 20 and 21. Recesses 30 and 31 in the surface 29 extend past the extremities 24 of the slot 23 to accommodate a pair of plastic, preferably nylon, sleeves 32 together with O-ring seals 33 at either end of each sleeve.

Longitudinal hydraulic passages 34 fed by cross passage 35 from an intensified pressure chamber 36 lead to outlet passages 37 communicating with the center of each of the sleeves 32 to pressurize and expand the diagonally slotted steel sleeves 20 and 21.

The expansion system is initially purged of air through bleed hole 38 closed by ball 39 and set screw 40. Continuous air pressure admitted from line 41 and cross passage 42 to chamber 43 sufficient to overcome seal drag and promptly return the small diameter intensifier piston 44 to the position shown with hydraulic pressure exhausted; and initial admission of hydraulic fluid to passage 45 can flow through feed lines 46 and 47 and cross passage 48 to make up any loss of hydraulic fluid and take up all clearance of the pressurizing system until the value of hydraulic pressure operating in the area of piston 49 overcomes the return air pressure and actuates the intensifying piston 44, initial movement of which causes the piston rod end 50 to seal off the cross passage 48 and supply intensified pressure, in the order of 10 to 1 times supply pressure, with expansion capacity equal to the volume of chamber 36.

Figure 4:
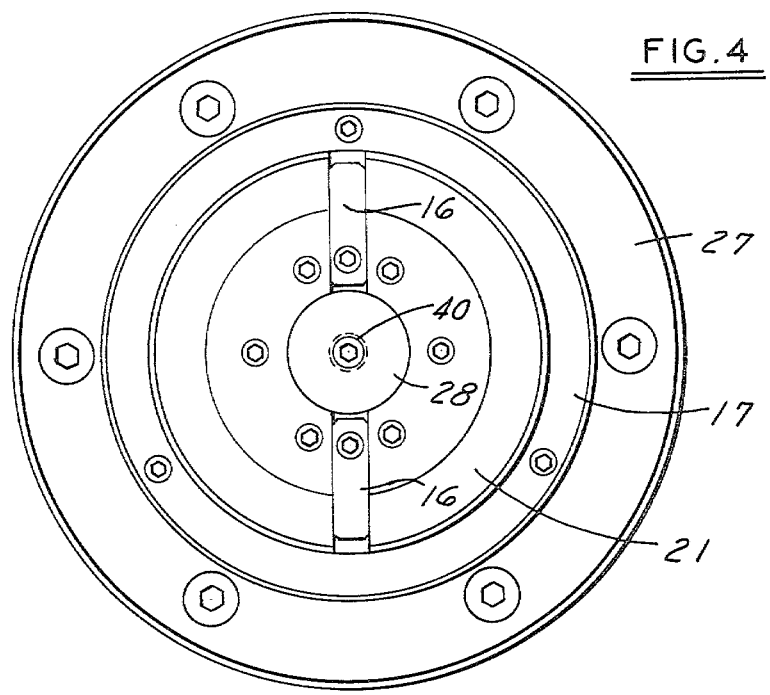
FIG. 4 is an end view taken along the line 4—4 of FIG. 1.

As previously mentioned a shoulder 26 of diagonally slotted sleeve 20 is bolted to the flange 27 and it also will be seen that the outer shoulder surface 51 provides an abutment for one end of the outer sleeve 11, the other end being engaged by a pair of retainers 16 secured to the end of the body 28 as best shown in FIG. 4. The diagonally slotted sleeve 21 is provided with an inwardly extending annular shoulder 52 which is bolted to the end of the arbor body 28 providing a rigidly secured arbor assembly.

For intensifying, hydraulic pressure applied to piston 49 is multiplied by the differential ratio of the areas of the chamber 43 and piston 44 minus the relatively low return air pressure in the chamber 43. As an alternative to air return hydraulic pressure may be fed to line 41 either at a relatively low constant value or through valving which supplies pressure only during the return cycle. In either case lip seals 53 are effective to separate the hydraulic pressure on the left end of the piston 49 from the air or hydraulic fluid in the chamber 43 at the right side of the piston. Lip seals 54 are likewise effective to seal the intensified hydraulic pressure in chamber 36 from chamber 43.

The sleeve tube 55 which provides the piston chamber 43 is press fit within a bore in the arbor body 28 supplied with pressure through passage 45 in an adapter cap 56 bolted into the end of the arbor body 28. The adapter cap is provided with a small pipe thread for a nipple 57 leading to the passage 45 and a large pipe thread for the rotor threads 58 of a commercially available rotating union 59 having a non-rotating oil inlet 60 and air inlet 61.

Figure 5:
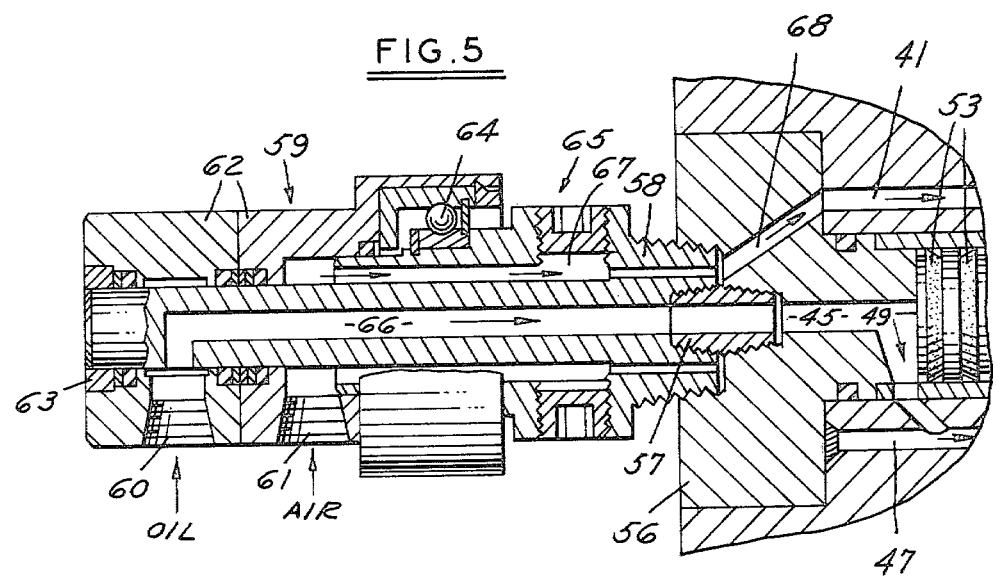
FIG. 5 is an enlarged sectional elevation of the rotating union taken along the line 505 of FIG. 3.

The internal construction of the rotating union is illustrated in FIG. 5 comprising non-rotating two-piece housing 62 having a sleeve bearing 63 and ball bearing 64 for supporting an internal rotor 65 having a central hydraulic passage 66 leading to the nipple 57 and connection with passage 45 and an external air passage 67 leading to air passage 68 in the adapter cap 56. Suitable O-ring seals and teflon backup washers accommodate moderate maximum hydraulic pressures in the order of 1,000 psi so that conservative supply pressures in the order of 500 psi may be employed with 10:1 intensification to achieve arbor expanding pressures in the order of 5,000 psi.

From the foregoing description it will be understood that standard valving may be employed together with pressure regulators and gaging to achieve accurately monitored sustained expansion clamping pressures to prevent any loss of pressure through leakage during machining operation which might lead to slippage and arbor and workpiece damage; also to prevent the possibility of underclamping or overstressing such as may be encountered with manually actuated ungaged application of hydraulic expansion pressures. It will also be understood that the system disclosed provides a rapid means for clamping and releasing workpieces for production runs including the possibility of partial or complete automation in effecting precision expandable arbor clamping for precision machining or other processing operations.

Figure 6:
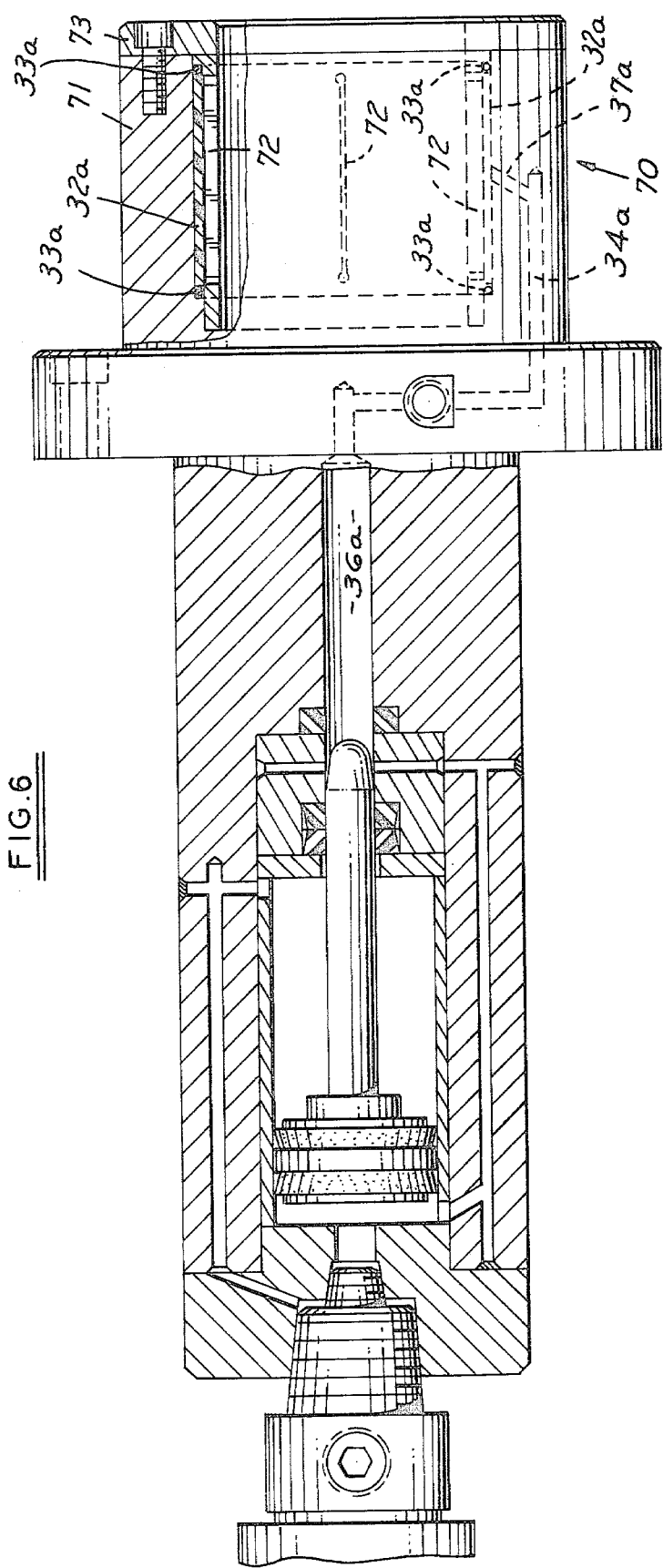
FIG. 6 is a side elevation illustrating the application of the hydraulic intensifier to a chuck.

With reference to FIG. 6 application of the system to radially inward clamping in a chuck 70 is illustrated wherein an intensified pressure similarly produced in chamber 36a is conducted through pressure lines 34a and outlet 37a to the outside of a nylon sleeve 32a retained between O-ring seals 33a within an undercut in the chuck body 71 thereby applying intensified radially inward hydraulic pressure to the slotted sleeve 72, preferably diagonal although illustrated in a straight configuration, such sleeve being retained by an end cap 73 bolted onto the end of the chuck.

I claim:

1. A rotary clamping tool having internal hydraulic pressure actuated means involving relatively high pressure requirements during rotation, a rotatable union connecting means for supplying relatively low pressure hydraulic fluid from a non-rotating outside source to said tool during its rotation means providing fluid communication between said pressure actuated means and said connecting means for initially admitting said low pressure hydraulic fluid to said pressure actuated means, and intensifying means within said tool operable during its rotation for subsequently closing off said communication means and converting said relatively low to said relatively high hydraulic pressure.

2. A rotary tool as set forth in claim 1 wherein said intensifying means includes differential area piston means.

3. A rotary tool as set forth in claim 2 wherein the ratio of differential area of said piston means is in the order of 10:1.

4. A rotary tool as set forth in any of the preceding claims wherein said hydraulic pressure actuated means includes means to retain a workpiece for processing operations applied during rotation.

5. A rotary tool as set forth in claim 4 including hydraulic pressure radially actuated sleeve means for engaging and retaining said workpiece against torsional forces applied thereto.

6. A rotary tool as set forth in claim 5 wherein said sleeve means is selected to facilitate radial actuation.

7. A rotary tool as set forth in claim 4 including air pressure actuated means for restoring said piston means to release position opening said communication means upon release of said actuating hydraulic pressure.

8. A rotary tool as set forth in claim 7 wherein a separate non-rotating means is provided for supplying air and hydraulic pressure respectively from an outside source.

* * * * *